Sept. 25, 1945.  H. C. HUFFMAN  2,385,705
PRODUCTION OF BUTADIENE
Filed March 10, 1942
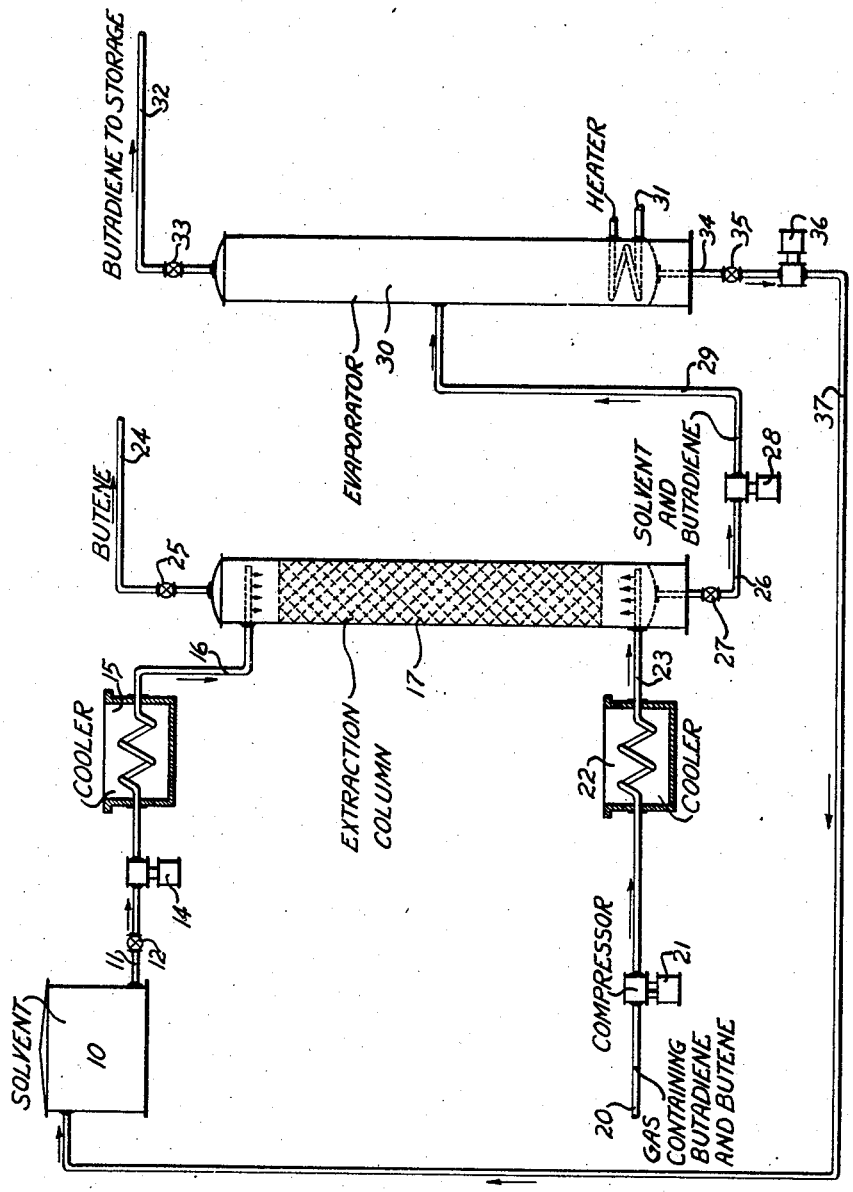
INVENTOR.
HAL C. HUFFMAN
BY Ross J. Garofalo
ATTORNEY Patented Sept. 25, 1945

2,385,705

UNITED STATES PATENT OFFICE 2,385,705

PRODUCTION OF BUTADIENE

Hal C. Huffman, Long Beach, Calif., assignor to Union Oil Company of California, Los Angeles, Calif., a corporation of California Application March 10, 1942, Serial No. 434,038

9 Claims. (Cl. 260—677)

The present invention relates to the separation or recovery of diolefins and higher olefins from gases containing the same. More specifically, the invention relates to the treatment of a gas with a selective solvent in order to separate diolefins such as butadiene from gases containing butadiene and butenes.

One of the methods proposed for producing butadiene (1,3-butadiene) or other diolefins consists in subjecting mono-olefins such as n-butenes to elevated dehydrogenating temperatures in the presence of a catalyst which results in converting a portion of the butenes into butadiene and hydrogen. The removal of the hydrogen from the products of dehydrogenation may be easily accomplished by well known rectification methods. However, the separation of the unconverted n-butenes from the butadiene by rectification is exceedingly difficult, impractical and uneconomical due to the fact that these components boil so close together.

It is an object of my invention to provide an economical and practical process for separating diolefins from the olefins and/or saturated hydrocarbons boiling substantially in the same temperature range as said diolefins.

Another object of my invention resides in the use of certain solvents for selectively extracting diolefins from mixtures containing the same.

Other objects, features and advantages of my invention will be apparent as the description of my process proceeds.

The solvents which I have discovered as useful for extracting butadiene and other diolefins from gases containing the same are those compounds of the general type in which one or more carboxyl groups have been substituted for hydrogen in thio-ethers, such as alkyl sulfides or thiophanes. More specifically, I prefer to use ethyl thioglycolic acid and/or its homologs, of which I prefer to use a mixture resulting from the acid hydrolysis of the reaction product of methyl, ethyl, propyl, butyl and amyl sodiomercaptides with sodium chloroacetate. Such a mixture of sodiomercaptides is usually available as refinery waste-alkali liquors which have been used to remove mercaptans from gasoline distillates. Ethyl thioglycolic acid ($CH_3CH_2$—S—$CH_2$—$CO_2H$) has a boiling point of about 123° C. at 15 mm. Hg pressure and a specific gravity of 1.148 at 26° C.

Solvents which may also be used are thioglycolic acids in which the alkyl group may be substituted by aryl groups or aralkyl groups. The invention also includes the use of RS-substituted carboxylic acids of the following type:

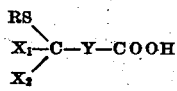

Where $X_1$ and $X_2$ are alkyl groups, unsaturated radicals derived from alkyl groups by loss of hydrogen, aralkyl groups, hydrogen, carbocyclic rings, heterocyclic rings or RS groups the same or different from the RS-group shown and in which R represents an alkyl, aralkyl, carbocyclic or heterocyclic group, or an unsaturated radical derived from an alkyl group by loss of hydrogen and Y represents $(CH_2)_n$ where $n=0$ or an integer which may be as high as 5 or higher.

In other words, the invention may be said to reside in the use as extraction solvents for the separation of olefins described herein, which solvents comprise RS-substituted carboxylic acids containing one or more carboxyl groups, as for example, the RS-substituted mono-carboxylic acids such as ethanoic, propanoic, butanoic, etc. acids or RS-substituted poly-carboxylic acids, such as succinic, adipic, etc., acids. Examples of such RS-substituted carboxylic acids include ethylthioethanoic (ethyl thioglycolic) acid, 3-propylthiopropanoic acid, 4-cyclohexylthiobutanoic acid, 2-methyl-3-phenylthiopropanoic acid, 2-isopropylthio-3-(2-pyridylthio)-butanoic acid, and 2-propenylthio-4-(p-tolyl)-pentanoic acid.

The following description of my invention as taken from the accompanying drawing which represents a diagrammatical view of apparatus adapted to carry out my invention may serve to aid in a better understanding of my invention.

In the drawing, the solvent, such as ethyl thioglycolic acid, is withdrawn from storage tank 10 via line 11 controlled by valve 12 and is pumped by pump 14 through cooler 15 where the solvent is cooled to the desired temperature of extraction. The cooled solvent is then passed via line 16 and is introduced into the top of the extraction column 17 which is provided with suitable contacting elements such as raschig rings, broken checkerwork, bubble plates, etc., in order to obtain intimate contact with the gas to be extracted. The solvent flows downwardly in the extraction column countercurrently to the upwardly flowing gas to be described.

The gas to be extracted, such as one consisting predominantly of butadiene and butene, coming into the system via line 20 is compressed by compressor 21, cooled to the temperature of extraction in cooler 22 and passed via line 23 into the bottom of the extraction column.

In the extraction column, the solvent selectively extracts the butadiene, leaving the butenes and other gases, such as iso-butene and butane free to be removed from the top of the column via line 24 controlled by valve 25. Valve 25 together with compressor 21 controls the pressure in the extraction column. During extraction, butadiene recovered in the process may be recycled to the extraction column to act as reflux during the extraction. The recycled butadiene may be returned either as a gas or it may be liquefied by compression and cooling and returned as a liquid.

The solvent containing the extracted butadiene is withdrawn from the bottom of the extraction column via line 26 controlled by valve 27 and is pumped by pump 28 and line 29 into an evaporator 30 which is provided with a heating coil 31 through which steam or other heated medium may be circulated to heat the solvent and evaporate the butadiene. The vaporized butadiene is withdrawn from the top of the evaporator via line 32 controlled by valve 33 and is passed to a suitable storage tank. Part of this butadiene is preferably recycled to the extraction column at a point near the center of the column. If the extraction is effected while the gas is in the liquid phase as explained hereinafter, it is preferable to liquefy the butadiene by compression and cooling before recycling it to the column. If the extraction is carried out on a gaseous mixture, the recycled butadiene may be either in the gaseous or liquid state.

The solvent free from the butadiene is withdrawn via line 34 controlled by valve 35 and is pumped by pump 36 through line 37 into storage tank 10 for further use as described above.

The extraction of the butadiene from the remaining gases may be carried out either while the gas is in the vapor state or while the gas is in the liquid state. In the latter case, the incoming gas in line 20 is compressed sufficiently to liquefy the gas when cooled in cooler 22. The temperature of extraction may vary between $-30°$ and $100°$ C. while the pressure may vary between atmospheric and superatmospheric pressures of 200 pounds per square inch. I prefer to effect the extraction at room temperature or below while the gas is in the vapor state and either at atmospheric or superatmospheric pressure. When the extraction is under superatmospheric pressure, the removal of the extracted butadiene in evaporator 30 may be accomplished or aided by releasing the pressure to atmospheric pressure.

While the foregoing description of my invention has been made with particular emphasis in the separation of butadiene from butenes, it will be observed that these solvents are also useful for separating other diolefins such as pentadiene from other hydrocarbons such as amylene. Nor is the invention to be considered restricted to the separation of diolefins from mono-olefins since these solvents will selectively extract the diolefins from saturated hydrocarbons such as butane, pentane, etc. These solvents are also capable of extracting diolefins from tertiary mono-olefins. Hence, diolefins may be extracted from mixtures containing also tertiary mono-olefins, straight chain mono-olefins and saturated hydrocarbons.

These solvents are also capable of selectively extracting tertiary mono-olefins, such as isobutylene from straight chain mono-olefins such as butylene and also saturated hydrocarbons, such as butane from said straight chain mono-olefins. The recovery of tertiary mono-olefins such as isobutylene is of great technical value since these may be hydrated to form tertiary alcohols which are reactive and commercially very useful. The tertiary mono-olefins can also be used to alkylate phenols to yield valuable tertiary alkyl phenols or to alkylate isoparaffins to give high octane aviation alkylate. Polymerization of some tertiary mono-olefins such as isobutylene to yield high octane gasoline may be brought about by the use of sulfuric acid, heat or other agents. Polymerization of isobutylene to high molecular weight polymers such as poly-isobutylene which are useful in rubber-like compositions is also of technical value.

The separate recovery of the straight chain mono-olefins from mixtures containing the tertiary mono-olefins is also of great technical value in the alkylation field. For example, n-butylenes have been found to give longer catalyst life and a better product when used in the alkylation of isoparaffins to yield aviation alkylate than does the tertiary mono-olefin or isobutylene.

Of course, in separating the various components disclosed above, the conditions of extraction, i. e., temperature, pressure and amount of solvent, will vary with the particular mixture to be extracted.

The presence of water in the solvent or during the extraction decreases the solubility of the solvent for various hydrocarbons included above. For example, the following table lists the solubilities at $25°$ C. of various hydrocarbons in ethyl thioglycolic acid of various concentrations:

Solubility (ml. gas/ml. solvent)

| Compound | 100% acid | 90% acid 10% $H_2O$ | 80% acid 20% $H_2O$ | 70% acid 30% $H_2O$ | 60% acid 40% $H_2O$ | 50% acid 50% $H_2O$ |
|---|---|---|---|---|---|---|
| 1,3-butadiene | 23.7 | 16.1 | 12.1 | 10.6 | 6.5 | 5.8 |
| 1-butylene | 0.6 | 1.9 | 3.6 | 4.4 | 3.8 | 1.5 |
| 2-butylene (cis and trans) | 2.0 | 2.0 | 2.4 | 5.0 | 3.3 | 2.5 |
| Iso-butylene | 11.3 | 8.8 | 7.6 | 5.2 | 4.0 | 2.7 |
| n-butane | 13.5 | 7.1 | 3.9 | 3.1 | 1.9 | 1.6 |

Thus, in the foregoing table, 1,3-butadiene is about 39.5 times more soluble in 100% strength acid than 1-butylene and 11.8 times more soluble than 2-butylene (cis and trans). Hence, the foregoing table illustrates the feasibility and desirability of operating with substantially pure solvents. However, since the respective solubilities of the various components are somewhat different even in the presence of water, a separation may be made between those components having relatively wide differences in solubilities in the solvent. For example, even when the solvent contains 50% water, the butadiene is at least twice as soluble as any of the other components listed above and hence butadiene may be separated from such components. However, under the same solvent-water ratio, it would be extremely difficult to separate butylenes from isobutylene and/or n-butane.

The following examples will further illustrate the nature of my invention:

*Example 1*

A gaseous mixture composed of approximately 32 parts by volume of 1,3-butadiene, 65 parts of n-butenes and 3 parts of butane and produced by dehydrogenation of n-butenes at a temperature of $575°$ C. in the presence of a catalyst composed of 5 parts by weight of beryllia, 5 parts of chromium sesquioxide and 90 parts of activated alumina, was countercurrently passed in contact with ethyl thioglycolic acid. Approximately 20 parts of the gaseous mixture were contacted per volume of the acid at a temperature of $27°$ C. and atmospheric pressure. The unabsorbed gas was separated from the solution of acid and the latter was then heated to $50°$ C. to remove the 1,3-butadiene extracted by the acid.

The gas separated from the solvent consisted of approximately 98% of 1,3-butadiene containing a small amount of butane and was recovered practically quantitatively.

Example 2

A gaseous mixture as in Example 1 was liquefied and cooled and was then extracted with an equal volume of propyl thio-glycolic acid at a temperature of approximately 20° C. and at a pressure of approximately three atmospheres. The extraction was accomplished by mixing the acid and the liquefied gas in a pressure bomb and then allowing the mixture to stratify into two layers, i. e., a lower layer of the acid containing dissolved butadiene and an upper layer of the unextracted butenes and butane. These layers were separated from each other by passing the solution of acid and butadiene from the bottom of the extraction bomb into a closed collecting vessel. The solvent solution was then heated to 50° C. to remove all of the butadiene from the solvent. The butadiene was recovered in substantially the same purity and yield as in Example 1.

Example 3

A mixture of approximately equal volumes of isobutylene and butene was extracted in accordance with the method employed in Example 1. The solution of solvent and isobutylene was distilled at 50° C. which resulted in the removal of the dissolved isobutylene from the solvent. The recovered isobutylene fraction was substantially pure.

Example 4

The same procedure as in Example 1 was employed to treat a mixture composed of equal volumes of butane and butenes with the result that the solvent extracted substantially all of the butane from the gaseous mixture.

The foregoing description of my invention is not to be taken as limiting the invention which may include any method which accomplishes the same within the scope of the appended claims.

I claim:

1. A process for separation of diolefins from hydrocarbon mixtures containing the same and boiling substantially in the same temperature range, which comprises extracting said hydrocarbon mixture with a compound having the general formula

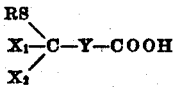

where $X_1$ and $X_2$ are selected from the group consisting of alkyl groups, unsaturated radicals derived from alkyl groups by loss of hydrogen, aralkyl groups, hydrogen, carbocyclic rings, heterocyclic rings and RS groups the same or different from the RS group shown and in which R is selected from the group consisting of an alkyl group, an aralkyl group, a carbocyclic group, a heterocyclic group, and an unsaturated radical derived from an alkyl group by loss of hydrogen and Y represents $(CH_2)_n$ where $n=0$ or an integer and thereby forming a solution of said compound and said diolefins and separating said solution from unextracted hydrocarbons.

2. A process for the separation of tertiary mono-olefins from a hydrocarbon mixture containing teritiary mono-olefins and other hydrocarbons and boiling substantially in the same temperature range, which comprises extracting said hydrocarbon mixture with a compound having the general formula

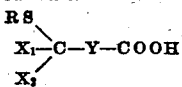

where $X_1$ and $X_2$ are selected from the group consisting of alkyl groups, unsaturated radicals derived from alkyl groups by loss of hydrogen, aralykyl groups, hydrogen, carbocyclic rings, heterocyclic rings and RS groups the same or different from the RS group shown and in which R is selected from the group consisting of an alkyl group, an aralkyl group, a carbocyclic group, a heterocyclic group, and are unsaturated radical derived from an alkyl group by loss of hydrogen and Y represents $(CH_2)_n$ where $n=0$ or an integer thereby forming a solution of said compound and said tertiary mono-olefins and separating said solution from unextracted hydrocarbons.

3. A process for the separation of butadiene from a hydrocarbon mixture containing butadiene and boiling substantially in the same temperature range, which comprises extracting said hydrocarbon mixture with a compound having the general formula

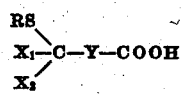

where $X_1$ and $X_2$ are selected from the group consisting of alkyl groups, unsaturated radicals derived from alkyl groups by loss of hydrogen, aralkyl groups, hydrogen, carbocyclic rings, heterocyclic rings and RS groups the same or different from the RS group shown and in which R is selected from the group consisting of an alkyl group, an aralkyl group, a carbocyclic group, a heterocyclic group, and an unsaturated radical derived from an alkyl group by loss of hydrogen and Y represent $(CH_2)_n$ where $n=0$ or an integer thereby forming a solution of said compound and butadiene and separating said solution from the unextracted hydrocarbons.

4. A process for the separation of butadiene from a hydrocarbon mixture containing butadiene and boiling substantially in the same temperature range, which comprises extracting said hydrocarbon mixture with ethyl thioglycolic acid, thereby forming a solution of said ethyl thioglycolic acid and butadiene and separating said solution from the unextracted hydrocarbons.

5. A process according to claim 1 in which the selective solvent comprises a major proportion of ethyl thioglycolic acid and a minor proportion of water.

6. A process for the separation of isobutylene from a hydrocarbon mixture containing the same and boiling substantially in the same temperature range which comprises extracting said mixture with a selective solvent comprising ethyl thioglycolic acid thereby forming a solution of said isobutylene and said selective solvent, and separating said solution from unextracted hydrocarbons.

7. A process according to claim 1 in which the selective solvent is ethyl thioglycolic acid.

8. A process according to claim 2 in which the compound is of the general formula shown and $X_1$ and $X_2$ are hydrogen groups, $n$ is zero and R is an alkyl group containing not more than five carbon atoms.

9. A process according to claim 3 in which the compound is of the general formula shown and $X_1$ and $X_2$ are hydrogen groups, $n$ is zero and R is an alkyl group containing not more than five carbon atoms.

HAL C. HUFFMAN.